(12) United States Patent
Restivo et al.

(10) Patent No.: US 8,485,222 B2
(45) Date of Patent: Jul. 16, 2013

(54) SYSTEMS AND METHODS FOR PREVENTING OIL MIGRATION

(75) Inventors: Anthony P. Restivo, Phoenix, AZ (US); Frank J. Zupanc, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1933 days.

(21) Appl. No.: 11/700,428

(22) Filed: Jan. 31, 2007

(65) Prior Publication Data

US 2008/0178833 A1    Jul. 31, 2008

(51) Int. Cl.
F04B 49/24    (2006.01)
F01M 9/10    (2006.01)
F01M 11/02    (2006.01)
F16H 57/04    (2010.01)

(52) U.S. Cl.
USPC .............. 137/563; 137/565.13; 137/565.31; 137/565.35; 184/6.12; 123/196 R

(58) Field of Classification Search
USPC ............ 137/565.13, 565.14, 565.31, 565.35, 137/563; 184/6.11, 6.14, 6.22, 6.5, 6.12; 123/196 R
See application file for complete search history.

(56) References Cited

U.S. PATENT DOCUMENTS

| | | | |
|---|---|---|---|
| 4,170,873 A * | 10/1979 | Milo | ............................ 60/39.08 |
| 4,429,587 A | 2/1984 | Finn, III et al. | |
| 4,531,358 A | 7/1985 | Smith | |
| 4,569,196 A | 2/1986 | Waddington et al. | |
| 4,891,934 A | 1/1990 | Huelster | |
| 5,023,789 A | 6/1991 | Lampe et al. | |
| 5,119,905 A | 6/1992 | Murray | |
| 5,845,483 A * | 12/1998 | Petrowicz | ....................... 60/788 |
| 6,058,694 A | 5/2000 | Ackerman et al. | |
| 7,506,724 B2 * | 3/2009 | Delaloye | ......................... 184/6.2 |
| 2005/0217272 A1 | 10/2005 | Sheridan et al. | |
| 2006/0249332 A1 * | 11/2006 | Bruce | .......................... 184/6.11 |

* cited by examiner

*Primary Examiner* — John K Fristoe, Jr.
*Assistant Examiner* — Atif Chaudry
(74) *Attorney, Agent, or Firm* — Ingrassia Fisher & Lorenz, P.C.

(57) ABSTRACT

Systems and methods are provided for preventing oil migration in an engine lubrication system. The system includes a gearbox, a shaft disposed at least partially in the gearbox, an oil reservoir in flow communication with the gearbox, an oil supply pump in flow communication with the oil reservoir and coupled to the shaft, an oil scavenge pump coupled to the shaft and configured to pump oil from the gearbox, and an oil cooler in flow communication with and disposed between the oil scavenge pump and the oil reservoir. The system also includes a bypass drain line disposed between the oil source and the oil supply pump, a drain valve disposed in the bypass drain line configured to close when the pressure is above a predetermined pressure, and a check valve disposed between the oil supply pump and the gearbox configured to open when the pressure is above the predetermined pressure.

18 Claims, 1 Drawing Sheet

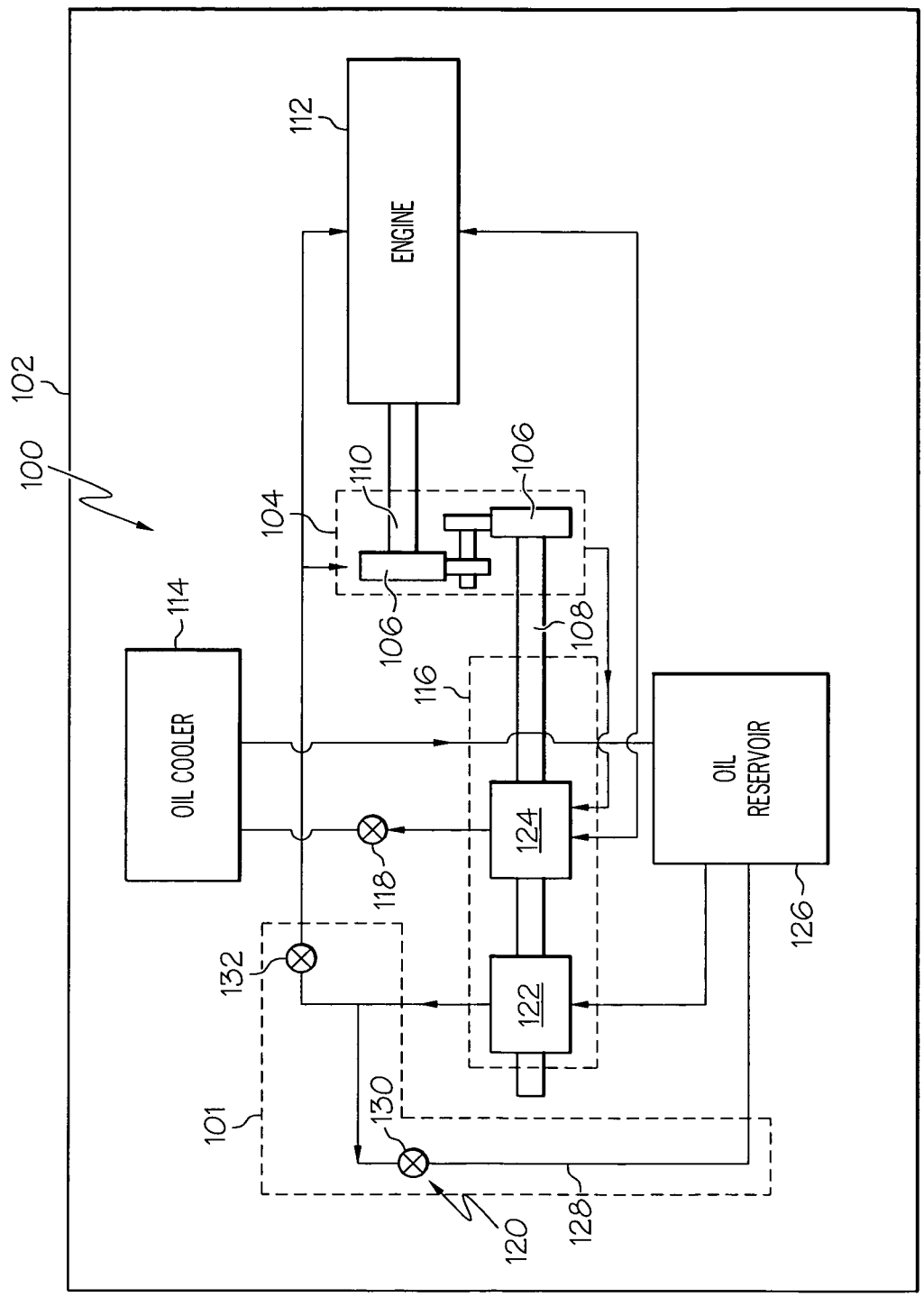

SYSTEMS AND METHODS FOR PREVENTING OIL MIGRATION

TECHNICAL FIELD

The inventive subject matter relates to systems and methods for preventing oil migration and, more particularly, to preventing oil migration in aircraft.

BACKGROUND

An aircraft may include a lubrication system to provide lubricants to certain components. Typically, the lubrication system includes at least an oil reservoir, an oil supply pump, and an oil scavenge pump. The oil supply pump may be configured to pump oil from the oil reservoir to a target component, and the oil scavenge pump may be configured to pump oil out of the target component back to the oil reservoir.

In many instances, the lubrication system is integral to, and supplies oil for, an aircraft engine, such as an auxiliary power unit, to lubricate gears, a drive shaft, and an engine shaft that are disposed at least partially in the engine or in an integral accessory gearbox. In these configurations, the oil supply pump and oil scavenge pump may be mounted to the drive shaft to be driven by the engine. When the drive shaft rotates, the oil supply pump draws oil from the oil reservoir and pumps the oil to the gearbox and engine, and the oil scavenge pump removes oil from the gearbox and engine and returns it to the oil reservoir. Typically, an oil cooler is disposed between the oil scavenge pump and the oil reservoir to thereby cool the oil before it is returned to the oil reservoir.

In some cases, oil is maintained in certain aircraft components, such as in the oil cooler, in order to comply with federal aviation regulations. In this regard, flow through the lubrication system is controlled by a check valve disposed between the oil scavenge pump and the oil cooler. The check valve is typically configured to open when the pressure of the oil being pumped through the oil cooler is greater than a predetermined pressure magnitude. In many instances, the predetermined pressure magnitude is relatively high (e.g., about 10 psi), so that oil can remain within the oil cooler during engine shutdown.

Although oil is suitably maintained in the oil cooler during engine operation, the above-mentioned lubrication system configuration has drawbacks. For example, when the engine is in a "forward windmill condition" (e.g., where the engine is shut down and unwanted inlet air flow impinges on an engine fan/compressor to turn the engine shaft), the engine shaft may rotate at low speeds, such as about 1% to about 3% of full engine speed. The engine shaft drives the oil supply/oil scavenge pump drive shaft. However, because the shaft rotational speeds are low during the windmill condition, the pressure generated by the oil scavenge pump may be inadequate (e.g., less than 10 psi) to cause the check valve to open. Thus, the rotating drive shaft may cause the oil supply pump to pump oil into the engine and gearbox, while the oil scavenge pump may be prevented from drawing oil out of the gearbox. Consequently, a volume of oil may remain in the gearbox, which may cause the oil reservoir to appear to be low. If oil is added to the oil reservoir, overboard oil leakage through a gearbox vent, inlet oil ingestion, and/or a cabin odor issue may result.

Therefore, there is a need for systems and methods that prevent oil migration into the gearbox when the engine is shut off and the engine shaft is rotating. Moreover, it is desirable for the systems to be capable of being retrofitted into existing engines. Additionally, it is desirable for the systems to be relatively inexpensive and simple to install.

BRIEF SUMMARY

The inventive subject matter provides systems and methods for preventing oil migration in a lubrication system.

In one embodiment, and by way of example only, an engine lubrication system is provided that includes a gearbox, a shaft, an oil reservoir, an oil supply pump, an oil scavenge pump, an oil cooler, a bypass drain line, a drain valve, and a check valve. The shaft is disposed at least partially in the gearbox. The oil reservoir is in flow communication with the gearbox. The oil supply pump is in flow communication with the oil reservoir and is coupled to the shaft and configured to supply oil to the gearbox at a pressure when the shaft rotates. The oil scavenge pump is coupled to the shaft and configured to pump oil from the gearbox to the oil reservoir when the shaft rotates. The oil cooler is in flow communication with and is disposed between the oil scavenge pump and the oil reservoir. The bypass drain line is disposed between the oil reservoir and the oil supply pump. The drain valve is disposed in the bypass drain line and is configured to close when the pressure is above a predetermined pressure. The check valve is disposed between the oil supply pump and the gearbox and is configured to open when the pressure is above the predetermined pressure.

In another embodiment, by way of example only, a kit is provided that includes a bypass drain line and a drain valve. The bypass drain line is configured to be disposed between the oil source and the oil supply pump. The drain valve is configured to be disposed in the bypass drain line and configured to close when the pressure is above a first predetermined pressure.

In still another embodiment, by way of example only, a method is provided that includes flowing the oil through a drain valve disposed in a bypass drain line between an oil supply pump and an oil reservoir when a supply check valve disposed between the oil supply pump and a gearbox is in a closed position, closing the drain valve when a flow pressure of the oil is greater than a predetermined pressure, and opening the supply check valve when the flow pressure of the oil is greater than the predetermined pressure.

Other independent features and advantages of the preferred systems and methods will become apparent from the following detailed description, taken in conjunction with the accompanying drawings which illustrate, by way of example, the principles of the inventive subject matter.

BRIEF DESCRIPTION OF THE DRAWINGS

FIG. 1 is a schematic of an engine lubrication system implemented in a portion of an aircraft, according to an embodiment.

DETAILED DESCRIPTION OF A PREFERRED EMBODIMENT

The following detailed description of the inventive subject matter is merely exemplary in nature and is not intended to limit the inventive subject matter or the application and uses of the inventive subject matter. Furthermore, there is no intention to be bound by any theory presented in the preceding background or the following detailed description.

Turning now to FIG. 1, a schematic of an engine lubrication system 100 disposed in a portion of an aircraft 102 is provided according to an embodiment. In an embodiment, the engine lubrication system 100 supplies and removes lubricant, such as oil, to and from components disposed within the aircraft 102. For example, in an embodiment, the engine lubrication system 100 provides lubricant to a gearbox 104 to lubricate one or more gears 106, portions of a gear shaft 108 that are at least partially disposed in the gearbox 104, and portions of an engine shaft 110 that are at least partially disposed in the gearbox 104. In another embodiment, the engine lubrication system 100 also provides lubricant to an engine 112 that is configured to drive the engine shaft 110. It will be appreciated that the engine 112 may be any one of numerous conventional engines that may need lubrication to sufficiently operate. Examples of suitable engines include, but are not limited to, for example, auxiliary power units. The engine 112, in some cases, may be in communication with an electric starter (not shown) that provides power to start the engine 112. In some embodiments, the engine 112 is cooled by an oil cooler 114, which receives lubricant from the engine lubrication system 100 as well.

An embodiment of an engine lubrication system 100 includes an oil pump assembly 116 and an oil migration prevention system 101, which may include a supply check valve 132 and a bypass assembly 120. The oil pump assembly 116 includes an oil supply pump 122 and an oil scavenge pump 124 that are both in fluid communication with an oil reservoir 126. The oil supply pump 122 and the oil scavenge pump 124 are mounted to the gear shaft 108, and each is configured to produce a pressure in response to rotation of the shaft 108, in an embodiment.

The oil supply pump 122 supplies lubricant from the oil reservoir 126 to the gearbox 104 and the engine 112. Thus, as shown in FIG. 1, the oil supply pump 122 is disposed between the oil reservoir 126 and the gearbox 104 and between the oil reservoir 126 and the engine 112. The oil scavenge pump 124 scavenges lubricant from the gearbox 104 and the engine 112 and returns the lubricant to the oil reservoir 126 via the oil cooler 114. A scavenge check valve 118 may be included between the oil scavenge pump 124 and the oil cooler 114 to control the flow of lubricant therebetween.

To provide additional control of the flow of lubricant through the engine oil system 100, the supply check valve 132 is disposed between the oil supply pump 122 and the engine 112 and gearbox 104. In one exemplary embodiment, the supply check valve 132 is configured to open when the pressure supplied by the oil supply pump 122 exceeds a predetermined pressure. The predetermined pressure may be a pressure that is produced by the oil supply pump 122 when the engine 112 is in operation. For example, the oil supply pump 122 may generate a pressure magnitude of about 10 psi during engine operation; thus, the predetermined pressure may be about 10 psi. It will be appreciated that any one of numerous conventional, suitable check valves may be employed. Specifically, the supply check valve 132 may be a spring-poppet-type valve.

As mentioned above, in a conventional system during a windmill condition, (e.g., when an engine is not in operation but the engine shaft and the gear shaft still rotate at a low speed), pressure within a scavenge circuit of the conventional system may not exceed a sufficient pressure of a scavenge check valve. As a result, lubricant may continue to be pumped through a supply circuit of the conventional system to a gearbox without being returned to an oil reservoir via the scavenge circuit. To reduce the likelihood for lubricant backup in the gearbox 104, a bypass assembly 120 is disposed between the oil supply pump 122 and the oil reservoir 126 in an embodiment, and is configured to allow lubricant to circulate between the oil supply pump 122 and the oil reservoir 126 when the engine 112 is shut down, yet rotating at a low speed.

An embodiment of a bypass assembly 120 includes a drain line 128 and a drain valve 130 disposed therein. The drain line 128 provides flow communication between the oil supply pump 122 and the oil reservoir 126. The drain valve 130 is configured to close when the pressure supplied by the oil supply pump 122 exceeds a predetermined pressure. In an embodiment, the predetermined pressure of the drain valve 130 may be substantially equal to the predetermined pressure of the supply check valve 132, although it does not have to be. The term "substantially equal" may be defined as being within about 0.5 psi. In another embodiment, the predetermined pressure of the drain valve 130 is less than the predetermined pressure of the supply check valve 132. For example, in an embodiment in which the predetermined pressure of the supply check valve 132 is about 10 psi, the predetermined pressure of the drain valve 130 may be about 6 psi. Alternatively, the predetermined pressure of the drain valve 130 may be about 3 psi. It will be appreciated that any one of numerous types of suitably configured drain valves may be employed, such as, for example, fixed valves, spring and poppet valves, or solenoid valves.

Thus, during operation, the engine 112 drives the engine shaft 110, which in turn drives the gear shaft 108. In response to the shaft rotation, the oil supply pump 122 and oil scavenge pump 124 operate and generate pressure sufficient to pump the lubricant through the supply check valve 132, as well as the scavenge check valve 118. Specifically, the oil supply pump 122 draws lubricant from the oil reservoir 126 and pumps the lubricant to the gearbox 104 and the engine 112. Because the pressure generated by the oil scavenge pump 124 during engine operation exceeds the predetermined pressure to open the scavenge check valve 118, lubricant is scavenged from the gearbox 104 and the engine 112 into the oil cooler 114, and the drain valve 130 remains closed to prevent lubricant from flowing through the drain line 128.

During a windmill condition when the engine 112 is shut down, air may be ingested into the engine 112 (e.g., an auxiliary power unit) and may impinge upon a fan/compressor (not shown) disposed in the engine 112. The fan may be coupled to the shafts 108, 110 and, in response to the ingested air, may thereby cause rotation thereof at low speeds, such as about 1% to about 3% of a maximum speed at which the engine 112 may be configured to operate. It will be appreciated that the engine maximum speed may depend on a particular engine, but may be between about 10,000 and 50,000 rpm. The low shaft rotational speed may generate sufficient pressure to pump the oil through the engine lubrication system 100; however, the pressure may not be sufficient to open the supply check valve 132. Because the drain valve 130 is configured to remain open until the pressure exceeds the predetermined pressure, lubricant can flow through the drain line 128 through the drain valve 130 between the oil supply pump 122 and the oil reservoir 126, instead of into the gearbox 104 and engine 112. When the pressure exceeds the predetermined pressure, the drain valve 130 closes and the supply check valve 132 opens to allow oil to flow between the oil supply pump 122 and the gearbox 104 and engine 112. Substantially simultaneously, the scavenge check valve 118 opens to allow oil to flow between the scavenge pump 124 and the oil cooler 114.

A system that may prevent oil migration when the engine is shut off and the engine shaft is rotating has been provided. The system may be capable of being retrofitted into existing engines. Additionally, the system may be relatively inexpensive and simple to install For example, an embodiment including a kit with a bypass assembly 120 (e.g., the drain line 128 and drain valve 130) and a supply check valve 132, may be integrated into an existing engine.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiments disclosed as the best mode contemplated for carrying out this inventive subject matter, but that the inventive subject matter will include all embodiments falling within the scope of the appended claims.

We claim:

1. An engine lubrication system for use in conjunction with an engine, the engine lubrication system comprising:
    a gearbox;
    a shaft disposed at least partially in the gearbox;
    an oil reservoir in flow communication with the gearbox;
    an oil supply pump in flow communication with the oil reservoir and coupled to the shaft, wherein the oil supply pump is configured to supply oil to the gearbox when the shaft rotates;
    an oil scavenge pump coupled to the shaft and configured to pump oil from the gearbox to the oil reservoir when the shaft rotates;
    an oil cooler in flow communication with and disposed between the oil scavenge pump and the oil reservoir;
    a bypass drain line disposed between the oil reservoir and the oil supply pump;
    a drain valve disposed in the bypass drain line configured to close when the pressure of the oil discharged by the oil supply pump exceeds a first predetermined pressure, the pressure of the oil discharged by the oil supply pump exceeding the first predetermined pressure as the engine becomes operational; and
    a first check valve disposed between the oil supply pump and the gearbox, the first check valve configured to open when the pressure of the oil discharged by the oil supply pump exceeds a second predetermined pressure substantially equal to or greater than the first predetermined pressure.

2. The system of claim 1, wherein the second predetermined pressure is substantially equal to 10 psi.

3. The system of claim 2, wherein the first predetermined pressure is about 6 psi.

4. The system of claim 2, wherein the first predetermined pressure is about 3 psi.

5. The system of claim 1, further comprising an aircraft engine coupled to the shaft.

6. The system of claim 1, further comprising a second check valve disposed between the oil cooler and the oil scavenge pump, the second check valve configured to open when the pressure of the oil supplied thereto by the oil scavenge pump is substantially equal to the second predetermined pressure.

7. A kit for implementation into an engine lubrication system utilized in conjunction with an engine, the engine lubrication system including a gearbox, a shaft at least partially disposed within the gearbox, an oil reservoir in flow communication with the gearbox, an oil supply pump in flow communication with the oil reservoir and coupled to the shaft, the oil supply pump configured to supply oil to the gearbox at a pressure when the shaft rotates above a predetermined speed, an oil scavenge pump coupled to the shaft and configured to pump oil from the gearbox to the oil reservoir when the shaft rotates above the predetermined speed, a first check valve configured to be disposed between the oil cooler and the oil scavenge pump and configured to open when the shaft rotates above a predetermined speed, and an oil cooler in flow communication with and disposed between the oil scavenge pump and the oil reservoir, the kit comprising:
    a bypass drain line configured to be disposed between the oil reservoir and the oil supply pump; and
    a drain valve configured to be disposed in the bypass drain line and configured to close when the pressure of the oil supplied to the inlet of the drain valve exceeds a first predetermined pressure, the first predetermined pressure selected such that the drain valve opens to allow the flow of oil through the bypass drain line when the engine is shutdown and closes to prevent oil flow through the bypass drain line when the engine becomes operational.

8. The kit of claim 7, wherein the first predetermined pressure is about 6 psi.

9. The kit of claim 7, wherein the first predetermined pressure is about 3 psi.

10. The kit of claim 7, further comprising:
    a second check valve configured to be disposed between the oil supply pump and the gearbox and to open when the pressure of the oil supplied by the oil supply pump to the inlet of the second check valve exceeds a second predetermined pressure substantially equal to or greater than the first predetermined pressure.

11. An engine lubrication system for use in conjunction with an aircraft engine, the engine lubrication system comprising:
    a gearbox;
    an oil reservoir fluidly coupled to an inlet of the gearbox;
    an oil supply pump fluidly coupled between an outlet of the oil reservoir and an inlet of the gearbox, the oil supply pump configured to be mechanically coupled to a shaft of the aircraft engine and, when driven by rotation of the shaft, to pump oil from the oil reservoir to the gearbox;
    a bypass drain line fluidly coupling an outlet of the oil supply pump to an inlet of the oil reservoir; and
    a drain valve fluidly coupled to the bypass drain line and to an outlet of the oil supply pump, the drain valve configured to close when the pressure of the oil supplied thereto exceeds a first predetermined pressure, the first predetermined pressure selected such that: (i) the drain valve is maintained in an open position to allow oil discharged from the oil supply pump to return to the oil reservoir through the bypass drain line when the aircraft engine is shutdown and when the shaft rotates at or below a predetermined rotational speed due to air ingested into the aircraft engine, and (ii) the drain valve closes to prevent oil flow through the bypass drain line when the aircraft engine becomes operational.

12. The engine lubrication system of claim 11, wherein the predetermined rotational speed is equal to or less than about 3% of the maximum speed of the aircraft engine.

13. The engine lubrication system of claim 11, further comprising a supply check valve fluidly coupled between an outlet of the oil supply pump and an inlet of the gearbox.

14. The engine lubrication system of claim 13, wherein the supply check valve is configured to open when the pressure of the oil supplied exceeds a second predetermined pressure, the first and second predetermined pressures selected such that the drain valve closes before the supply check valve opens as the pressure output of the oil supply pump increases during start-up of the aircraft engine.

15. The engine lubrication system of claim 14, wherein the second predetermined pressure is substantially equal to or greater than the first predetermined pressure.

16. The engine lubrication system of claim 15, wherein the second predetermined pressure is equal to or greater than about 10 psi, and wherein the first predetermined pressure is equal to or less than about 6 psi.

17. The engine lubrication system of claim 13, further comprising:
- an oil cooler fluidly between an outlet of the gearbox and an inlet of the oil reservoir;
- an oil scavenge pump fluidly coupled between an outlet of the gearbox and an inlet of the oil reservoir, the oil supply pump configured to be mechanically coupled to the shaft of the aircraft engine and, when driven by rotation of the shaft, to pump oil from the oil cooler to the oil reservoir; and
- a scavenge check valve fluidly coupled between an outlet of the oil scavenge pump and an inlet of the oil cooler, the scavenge check valve configured to close during engine shutdown and to open when the aircraft engine becomes operational.

18. The engine lubrication system of claim 17, wherein the scavenge check valve is configured to open at substantially the same time as does the supply check valve during engine start-up.

\* \* \* \* \*